United States Patent Office 2,855,382
Patented Oct. 7, 1958

2,855,382
BORATED RESINS

James S. Mitchell, Philadelphia, Pa., assignor to The Borden Company, a corporation of New Jersey No Drawing. Application April 2, 1956
Serial No. 575,372

4 Claims. (Cl. 260—57)

This invention relates to the condensation of a phenol and an aldehyde in contact with an acidic boron compound and an acidic condensation catalyst.

The invention is particularly useful in condensing mixed phenol, formaldehyde, and boric acid to produce novolac type resin for use in making molding compositions. The invention will be illustrated, therefore, by description in connection with this embodiment of the invention.

In forming plastics in molds containing sharp or small crevices or interstices, it is important that the material being molded should be of such high viscosity as to permit its being forced into the mold at high pressure without excessive oozing of the material through the joint line of meeting parts of the mold to cause "flash."

The present invention provides a condensation product that may be made highly viscous without use of an added curing catalyst and that is suitable for use in molding at high pressures, that is, at high back pressures, with decrease in the amount of flash to a relatively unobjectionable amount.

Using proportions of boric acid within the range 3–12 parts, for instance, for 100 of total weight of phenol and formaldehyde on the anhydrous basis and causing condensation, as described herein, I have obtained products that, after dehydration, show outflow times from the resin reaction kettle through an approximately 2-inch pipe that are 3–70 times as long as for the lower viscosity material made similarly but without the use of boric acid during the condensation of the phenol with the formaldehyde. Using 5 parts of boric acid in a representative preparation, I have reduced the flash in molding a cup weighing approximately 15 grams from 0.36 gram with the conventional novolac resin to 0.01 gram with the resin made similarly but with boric acid added before the condensation of the phenol with the formaldehyde was begun.

Briefly stated, the invention comprises the herein described process and the product resulting from condensing phenol with an aldehyde in contact with an acidic catalyst of the condensation and with a boric acid or the anhydride thereof, the boric acid or anhydride being added before the condensation of the phenol and the formaldehyde has proceeded to a substantial extent so that the major part of the condensation occurs in contact with the boric acid.

In this manner I obtain the high viscosity product with the high pressure molding characteristics adapting the material to be molded at high pressures without flashing through the mold joint to the extent previously experienced. Also I obtain a product that may be cured either with or without the addition of a conventional curing agent such as hexamethylenetetramine, with retention of some solubility in acetone and like solvents.

As the acidic boron compound, I use boric acid or its anhydride, representative boric acids being the ortho- or the tetra- or pyrobic acids. Ordinarily I use the acid $H_3BO_3$ although it may be substituted by its anhydride $B_2O_3$.

As the acid catalyst of condensation, I employ any one of those commonly utilized in the manufacture of phenol and formaldehyde condensation products, as for example, sulfuric, oxalic, or hydrochloric acid.

Water is introduced to advantage into the mixture to undergo condensation, at least in the amount if any required to dissolve the boric acid in the phenol and aldehyde mixture used. When the formaldehyde is supplied in the form of one of its commercial aqueous solutions such as formalin, no additional water is required.

In compounding the condensation product of the phenol, formaldehyde and boric acid, to make molding compositions, I incorporate conventional ingredients for their usual effects, as for example any of the common fillers, dyes, and parting agents commonly used in molding compositions from phenol and formaldehyde condensation products.

The proportion of formaldehyde to phenol and the pH of the mixture undergoing condensation must be controlled carefully.

The proportion of formaldehyde is within the range about 0.7–0.94 mole of formaldehyde for one mole of phenol. If the proportion of the formaldehyde is reduced to 0.65 mole, for instance, then the resulting condensation product is objectionably soft and too low in melting point for many purposes. If the proportion of the formaldehyde is higher, say 1.2 moles, on the other hand, then there is encountered frequently the objection of premature gelling of the product.

The acid catalyst of condensation is added in proportion to establish the pH of the whole mixture undergoing condensation within the range approximately 0.8–0.9. If the pH is lowered, as to 0.5, then the condensation is so rapid as to be difficult to control without refrigeration or other special moderating means. If, on the other hand, the pH is raised to 1.2, then the time required for the condensation is lengthened to an uneconomic period.

The proportion of boric acid may be varied within the range 3–30 parts for 100 parts of total weight of the phenol and formaldehyde on the anhydrous basis, in accordance with the viscosity desired in the resulting product, the viscosity increasing with the proportion of the boric acid used during the condensation. Proportions within the range 3–12 parts of boric acid for 100 of the said combined weight are recommended for commercial usage. Larger amounts than 12 parts are permissible but for most purposes are not justified economically.

As to conditions of condensation, it is necessary that the boric acid be present from an early stage and ordinarily the beginning of the condensation up to and including the completion thereof.

The temperature of condensation is elevated and is suitably at or near the temperature of refluxing of the mixture. Lower temperatures lengthen the time without introducing offsetting advantages. The final temperature of the condensation should be at least 250° F. and suitably between this lower temperature and 300°–325° F.

The time of condensation is that required to bring the reaction to the novolac stage and the content of free formaldehyde to a practically constant level such as less than 2% of the weight of the mixture of all ingredients after the condensation and also to raise the viscosity to that desired for the condensation product of the high pressure molding characteristic. Thus I heat the condensation mixture for a period of about 2–5 hours and to the final temperature stated, until the product is so viscous as to show a minimum flash in high pressure molding results. When a product of still higher viscosity is desired, then I apply vacuum during the last stages of said heating.

Products made as described and heated, as to 300° F. or moderately higher in contact with air in order to allow for escape of moisture, not only become cured, either with or without the incorporation of hexamethylenetetramine before the heating, but also retain some substantial solubility in acetone and like solvents. These features, as well as the higher viscosity, are distinctions from the ordinary novolac resin or from such resins mixed with boric acid subsequent to the condensation.

The invention will be further illustrated by description in connection with the following specific examples of the practice of it. In these examples and elsewhere herein proportions are expressed as parts by weight unless specifically stated to the contrary.

*Example 1*

A phenol-formaldehyde condensate resin was prepared by first mixing together 100 parts of phenol, 71 parts of formaldehyde solution containing 37.5% of formaldehyde, 1.6 parts of 10% sulfuric acid solution, and 5 parts of boric acid. The mixture showed a pH of 0.9.

This mixture was heated under a reflux condenser for approximately 4 hours. Then the condenser was reversed and the heating continued up to a final temperature of 300° F., to drive off the water and produce a resin of desired high viscosity as measured by the "drop point" temperature.

The drop point test provides a means whereby the kettle operator may promptly decide when to stop distillation and discharge the resin from the kettle. The test is made as follows: A 75 x 11 mm. test tube is filled with the molten resin. A special thermometer 40° F.–300° F., with a 2.5 inch immersion engraved on stem, is inserted into the charge in the filled test tube up to the engraved mark. The test tube is then cooled to 120° F. and completely immersed in a vertical position in an oil bath in a beaker, at a temperature of 284° F., the bottom of the test tube being exactly one inch from the bottom of the bath. The rise in temperature within the test tube is observed on the thermometer. As the resin softens, the resin loosens itself from the thermometer and the test tube drops. The moment the tube touches the bottom of the beaker, the temperature is read on the thermometer and recorded as the drop point of the resin.

The heating and distillation, as at 300° F. at the end, are continued until the resin becomes grindable when cold and much more viscous at elevated temperatures than is the case with the ordinary resins containing no boric acid at the same temperatures. The viscosity may be increased still further by continued heating and the application of vacuum to the reactor vessel, all as indicated by the drop point reading which normally lies within the range 240° F. and 250° F.

The condensed and partially dehydrated resin may be produced in a liquid state by stopping short of the end point stated above for the heating or be dissolved to form a spirit solution.

To make molding compositions, the anhydrous condensation product may be mixed with from 8%–12% of hexamethylenetetramine as curing agent, a conventional parting agent, and a customary filler. Examples of fillers that may be used are wood flour, linters, wood pulp, asbestos, clay, barytes, whiting, lithopone, and carbon black. The condensation product may be coated on paper or textile fabric. It may be colored with dyes or pigments.

The condensation product is unique in its characteristics. It melts at approximately the usual fusing temperature for phenol-formaldehyde resins, but the melted resin is much more viscous, that is, less watery, than is the case with the ordinary resins made similarly but without the boric acid. As a result, better and sharper moldings under high pressure are obtainable with a reduced loss of resin because of flash at the line of closure of the mold. Also, the material shows greater rigidity and higher stiffness at elevated temperatures, thereby making it possible to strip the mold almost immediately without danger of deforming the molded article.

*Example 2*

The resin of Example 1 is ground to a fine powder and used for the preparation of a molding powder containing substantial quantities of filler such as wood flour. A suitable molding powder composition is thus prepared of the following formula:

| Component: | Parts |
|---|---|
| Resin | 100 |
| Hexamethylenetetramine | 10 |
| Wood flour | 100 |
| Nigrosine black dye | 4 |
| Calcium stearate (parting agent) | 2 |
| Hydrated lime | 2 |

This composition may be prepared by mixing in any convenient mixing device such as a kneader of the Werner and Pfleiderer type.

Because of the boric acid used in the original condensation, the composition shows a rapid curing even at a moderate temperature such as 300° F.

*Example 3*

The procedure and compositions of Example 2 are followed except that the hexamethylenetetramine as curing catalyst is omitted.

*Example 4*

A resin is prepared by the general procedure of Example 1 using the following materials for the condensation.

| Material: | Parts |
|---|---|
| Phenol | 100 |
| Formaldehyde, 37.5% solution | 71 |
| Boric anhydride | 3 |
| 10% solution of $H_2SO_4$ | 1.6 |

This resin shows a substantial improvement over conventional novolac resins in speed of cure, back pressure permissible in molding, and the other valuable properties above outlined.

It is to be understood that it is intended to cover all changes and modifications of examples of the invention herein chosen for the purpose of illustration which do not constitute departures from the spirit and scope of the invention.

This application is a continuation in part of my copending application Serial No. 280,660, filed April 4, 1952, now abandoned.

The invention claimed is:

1. In making a resin characterized by being grindable and by high pressure molding characteristics of molding compositions containing the resin, the process which comprises forming an aqueous solution consisting essentially of phenol in the proportion of 1 mole, formaldehyde about 0.7–0.94 mole, an acidic boron compound selected from the group consisting of boric acids and their anhydrides in the proportion of 3–30 parts by weight for 100 of combined weight of the phenol and formaldehyde, and an acid catalyst of condensation selected from the group consisting of sulfuric, hydrochloric and oxalic acids in amount to establish the pH of the said solution at approximately 0.8–0.9, the water in the solution being in amount adequate at least to dissolve the boron compound, warming the said solution to cause condensation of the condensable materials to the novolac resin stage in contact with the boron compound at all times from the beginning of the condensation, and then heating the resulting mixture in communication with the atmosphere until the resulting material is dehydrated.

2. The process of claim 1 in which the said boron compound used is boric acid and the said acid catalyst is sulfuric acid.

3. The process of claim 1 which comprises mixing the final dehydrated material with hexamethylenetetramine in the proportion of approximately 8%–12% of the said dehydrated material and then heating the resulting mixture to an elevated temperature above melting and maintaining the elevated temperature until the mixture is cured.

4. The process of claim 1 which includes heating the final dehydrated material at a temperature of about 250°–325° F. until the said dehydrated material is cured.

References Cited in the file of this patent

UNITED STATES PATENTS

| | | |
|---|---|---|
| 1,678,107 | Deutsch et al. | July 24, 1928 |
| 2,606,887 | Pearce | Aug. 12, 1952 |
| 2,606,888 | Williams et al. | Aug. 12, 1952 |
| 2,606,889 | Ward et al. | Aug. 12, 1952 |

FOREIGN PATENTS

| | | |
|---|---|---|
| 289,565 | Germany | Dec. 9, 1911 |
| 537,367 | Germany | Nov. 2, 1931 |
| 719,694 | Germany | Apr. 14, 1942 |